No. 757,695. PATENTED APR. 19, 1904.
W. A. TURBAYNE.
ELECTRIC LIGHTING AND POWER SYSTEM.
APPLICATION FILED JAN. 13, 1902. RENEWED SEPT. 29, 1903.
NO MODEL.
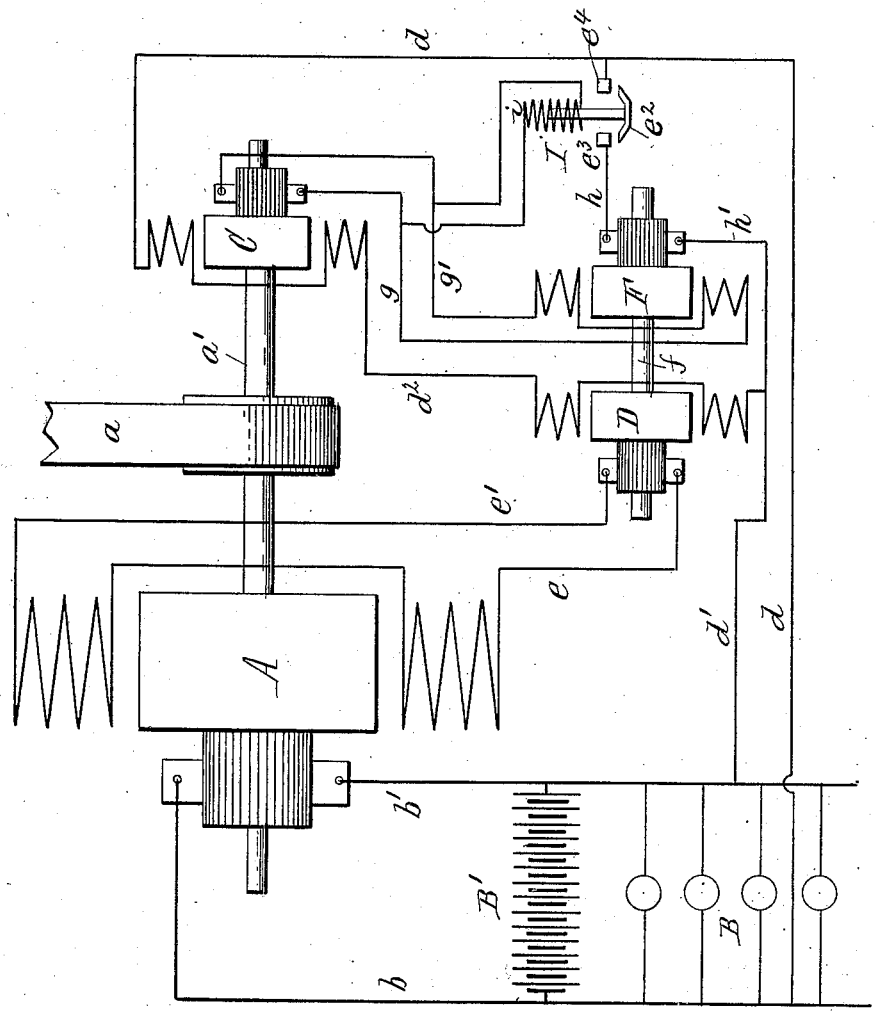

No. 757,695. Patented April 19, 1904.

UNITED STATES PATENT OFFICE.

WILLIAM A. TURBAYNE, OF BUFFALO, NEW YORK, ASSIGNOR TO CHARLES M. GOULD, OF NEW YORK, N. Y.

ELECTRIC LIGHTING AND POWER SYSTEM.

SPECIFICATION forming part of Letters Patent No. 757,695, dated April 19, 1904.

Application filed January 13, 1902. Renewed September 29, 1903. Serial No. 175,091. (No model.)

*To all whom it may concern:*

Be it known that I, WILLIAM A. TURBAYNE, a citizen of the United States, residing at Buffalo, in the county of Erie and State of New York, have invented new and useful Improvements in Electric Lighting and Power Systems, of which the following is a specification.

This invention relates to an electric lighting and power system in which the dynamo for generating the current is subject to considerable variation in its driving speed or is driven in opposite directions.

The invention is especially adapted for use in lighting railway-cars, where the generating-dynamo is preferably driven from the car-axle and is therefore subjected to wide variations of axle speed. In such use, as it is imperative that the lights be maintained when the car is not in motion, a storage battery is used in conjunction with the dynamo, and for this reason it is necessary that the dynamo deliver current to the battery always in the same direction irrespective of the direction of rotation of the driving-axle and dynamo-shaft.

One object of the invention is to provide means whereby a predetermined difference of potential is maintained across the terminals of the dynamo irrespective of the speed at which the dynamo-armature is driven.

A further object is the provision of means whereby the dynamo will deliver current in the same direction whatever be the direction of rotation of the armature.

It is a well-known fact that the electromotive force of a dynamo having a separately-excited field-magnet will rise directly as the speed of rotation of its armature—that is, if the speed of the armature be doubled its electromotive force will also be doubled, or if the rotative speed be lowered its terminal electromotive force will fall accordingly. On the other hand, the electromotive force of a dynamo also varies directly as the strength of its field-magnet, so that if the strength of its field-magnet be increased in exact proportion as its speed of rotation is decreased, or if its strength of field be reduced in proportion as its speed be increased, the electromotive force at the armature-terminals will remain practically constant. It is also well understood that an electric motor having its field-magnet cores worked at a low degree of magnetic saturation and its armature connected to a constant source of electromotive force may have its rotative speed increased or decreased, accordingly as its field-magnet is respectively weakened or strengthened. By utilizing these principles in the manner hereinafter described it is possible to directly and automatically control the field excitation of a dynamo, so as to maintain a constant electromotive force at its brush-terminals and also a constant direction of the current through its circuit.

In the accompanying drawing the figure is a diagrammatic view illustrating a lighting system embodying the invention.

Referring to the drawing, A represents the main generator, the armature of which is driven from some suitable source of power—as, for instance, the car-axle by a belt $a$ running on a pulley on the armature-shaft $a'$.

B represents the lights or other translating devices, and B' the storage battery, both of which are included in the circuit $b\ b'$, connecting with the generator-brushes.

C represents a small dynamo the armature of which is driven by the same power and subject to the same speed variations as the generator A, and D represents a third dynamo, the field-magnets of both of said dynamos C and D being energized from some practically constant source, such as the storage battery B', which for this purpose is included in the field-circuit of the dynamos C and D by wires $d$, $d'$, and $d^2$. The brushes of the dynamo D are connected to the field-magnet windings of the main dynamo A, as by wires $e\ e'$, so that the latter dynamo is excited wholly by the dynamo D. The fields of the dynamos C and D may, if preferred, be energized from any other suitable practically constant source or sources.

F represents a motor for driving the third dynamo D, for which purpose the armatures of the motor and dynamo are shown in the drawing as secured to the same shaft $f$. The field-magnet of the motor is connected, as by wires $g\ g'$, to the brushes of the dynamo C, while its armature is connected to a practically constant source, preferably the same source as the fields of the dynamos C and D—for instance, by wires $h$ $h'$, connecting, respectively, with the wires $d$ $d'$, leading from the main circuit.

I represents an electrically-actuated switch which operates to connect the armature of the motor F to its source of current when the electromotive force of the dyanmo C has reached a certain predetermined value. The switch shown in the drawing comprises a solenoid-coil $i$, arranged in a shunt of the circuit, which energizes the field of the motor, and a movable core carrying a contact-piece $e^2$, adapted to contact with and connect two separated contacts $e^3$ $e^4$ in the wire $h$ of the armature-circuit of the motor.

The operation of the system is as follows: Immediately upon rotation of the shaft $a'$, carrying the armatures of the dynamos A and C, the latter machine, as its fields are energized from a constant source, will generate a current the electromotive force of which will rise directly as the speed of rotation of its armature. The current as set up passes around the field-windings of the motor F, energizing its iron cores, which are preferably worked at a low degree of magnetic saturation. When the electromotive force of the dynamo C reaches a sufficiently-high value, the solenoid I acts to connect the armature of the motor F to its source of current, which as its magnets are excited will at once rotate at a speed varying according to its field excitation. The armature of the dynamo D being directly attached to the armature of the motor F will at once supply current to energize the field-magnets of the main generator A, which will in turn furnish current to the main or work circuit. Any rise in the speed of the dynamo C will result in increasing the excitation of the field of the motor F, consequently reducing the speed of its armature and likewise the excitation of the main generator, while, on the other hand, a reduction of the speed of the armature of the dynamo C will result in a consequent weakening of the motor-field excitation. The speed of the motor therefore will increase, and thus increase the excitation of the main-dynamo field. In practice the speed of the motor F will vary inversely as the speed of the main-dynamo armature, and its field excitation will therefore also vary in the same ratio, with the result that the electromotive force at the main brushes will be practically constant.

Should the direction of rotation of the armature of the main dynamo A be reversed, as the fields of the dynamo C are constantly excited in one direction its armature-current, and consequently the direction of the current, through the motor-field will be reversed, which in reversing its polarity will also reverse its direction of rotation, thus at the same time reversing the current from the dynamo D and likewise the polarity of the main-dynamo fields. The same direction of the current from the main dynamo A is thus automatically maintained, inherently rendering the use of pole-changing devices unnecessary.

The regulating effect of dynamo C on the exciter apparatus F D is such as to increase the electromotive force of the exciting-current for the main generator in inverse proportion to the speed of said generator irrespective of the variations of current in the main circuit. In fact, the apparatus may be wound or adjusted so as to maintain a substantially constant condition of main current passing to the battery with wide variations of speed. It has been proposed to effect a regulation of the main-generator excitation inversely to changes in the main current; but as such a system of regulation presupposes for its action some variation in the current it is obviously impossible to secure thereby effective regulation to a substantially constant current. In the system herein described and claimed the regulation is only dependent on a variation in speed and does not have to await any resulting change of current. It is therefore a more sensitive and quickly responsive system of regulation, as well as more efficacious, than one depending on a variation of current.

The system herein described is inherently self-regulating, and the current in the main circuit can only be delivered in one direction irrespective of the direction of rotation of the generator-armature, and this without the use of mechanical pole-changing devices.

I claim as my invention—

1. The combination of a generator and electric circuit, an exciter for the field-winding of the generator, an electric motor actuating said exciter and having its armature supplied from a practically constant source, and means for varying the field magnetism of the motor in correspondence with variations in the speed of the armature of the generator and irrespective of variations of current in the main circuit, substantially as set forth.

2. The combination of a generator and an electric circuit, an exciter for the field-winding of the generator, an electric motor actuating said exciter and having its armature supplied from a practically constant source, and means for varying the speed of the motor inversely to the variations in speed of the armature of the generator and irrespective of variations of current in the main circuit, substantially as set forth.

3. The combination of a generator and an electric circuit, an exciting-dynamo for the field-winding of the generator, an electric motor for actuating said exciting-dynamo and having its armature supplied from a practically constant source, and a dynamo for exciting the field of said motor and having its armature driven at a speed which varies correspondingly with the speed of the armature of the main generator, substantially as set forth.

4. The combination of a main generator and an electric circuit, a dynamo for exciting the field of said main generator and having its field supplied from a practically constant source, a dynamo having its field supplied from a practically constant source and the speed of the armature of which varies correspondingly with the speed of the armature of the main generator, and a motor for driving said exciting-dynamo and having its armature supplied from a practically constant source and its field supplied from said second-mentioned dynamo, substantially as set forth.

5. The combination of a main generator and an electric circuit, a dynamo for exciting the field of said main generator, a second dynamo the armature of which is driven at a speed corresponding to the speed of the armature of the main generator, a motor for driving said first dynamo and the field of which is supplied from said second dynamo, the fields of said dynamos and the armature of said motor being supplied from the same practically constant source, substantially as set forth.

6. The combination of a generator and an electric circuit, an exciter for the field-winding of the generator, an electric motor actuating said exciter and having its armature supplied from a practically constant source, an electric circuit for varying the field magnetism of the motor in correspondence with the variations in the speed of the armature of the generator, and an electric switch included in said circuit and controlling said source of supply for the motor-armature, substantially as set forth.

7. The combination of a main generator, an exciter apparatus therefor comprising a dynamo and means for driving the same, and means for controlling the electromotive force of the exciter apparatus in inverse correspondence with the speed of the main generator, substantially as set forth.

8. The combination of a main generator, an exciter apparatus therefor comprising a dynamo and means for driving the same, a dynamo driven at a speed corresponding to that of the main generator and having its armature-circuit connected to the exciter apparatus to vary the electromotive force thereof in inverse correspondence with the speed of the main generator, substantially as set forth.

9. The combination of a main generator, a storage battery connected therewith, an exciter apparatus therefor comprising a dynamo and means for driving the same, and means for controlling the electromotive force of the exciter apparatus in inverse correspondence with the speed of the main generator, substantially as set forth.

10. The combination of a main generator, a storage battery connected therewith, an exciter apparatus therefor comprising a dynamo and means for driving the same, a dynamo driven at a speed corresponding to that of the main generator and having its armature-circuit connected to the exciter apparatus to vary the electromotive force thereof in inverse correspondence with the speed of the main generator, substantially as set forth.

Witness my hand this 7th day of January, 1902.

WILLIAM A. TURBAYNE.

Witnesses:
CHAS. W. PARKER,
JNO. J. BONNER.